US009135205B1

(12) United States Patent
Ryan et al.

(10) Patent No.: US 9,135,205 B1
(45) Date of Patent: *Sep. 15, 2015

(54) DATA STORAGE ASSEMBLY FOR ARCHIVE COLD STORAGE

(71) Applicant: Western Digital Technologies, Inc., Irvine, CA (US)

(72) Inventors: Robert P. Ryan, Mission Viejo, CA (US); Dean M. Jenkins, La Canada-Flintridge, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/608,980

(22) Filed: Jan. 29, 2015

Related U.S. Application Data

(63) Continuation of application No. 14/023,386, filed on Sep. 10, 2013, now Pat. No. 8,947,816.

(60) Provisional application No. 61/818,287, filed on May 1, 2013.

(51) Int. Cl.
*G11B 20/18* (2006.01)
*G06F 13/40* (2006.01)
*G11B 5/48* (2006.01)
*G11B 20/10* (2006.01)
*G06F 13/28* (2006.01)

(52) U.S. Cl.
CPC .......... *G06F 13/4081* (2013.01); *G06F 13/287* (2013.01); *G11B 5/4806* (2013.01); *G11B 20/10046* (2013.01); *G11B 20/18* (2013.01)

(58) Field of Classification Search
None
See application file for complete search history.

(56) References Cited

U.S. PATENT DOCUMENTS

| | | | | |
|---|---|---|---|---|
| 4,851,939 A | * | 7/1989 | Seo et al. | 360/77.02 |
| 5,084,789 A | * | 1/1992 | Kamo et al. | 360/53 |
| 5,544,135 A | * | 8/1996 | Akin et al. | 369/30.12 |
| 5,572,699 A | | 11/1996 | Kamo et al. | |
| 5,696,933 A | | 12/1997 | Itoh et al. | |
| 5,710,675 A | * | 1/1998 | Goldstone et al. | 360/69 |
| 5,832,204 A | * | 11/1998 | Apperley et al. | 714/42 |
| 6,018,789 A | | 1/2000 | Sokolov et al. | |
| 6,065,095 A | | 5/2000 | Sokolov et al. | |
| 6,078,452 A | | 6/2000 | Kittilson et al. | |
| 6,081,447 A | | 6/2000 | Lofgren et al. | |
| 6,092,149 A | | 7/2000 | Hicken et al. | |
| 6,092,150 A | | 7/2000 | Sokolov et al. | |
| 6,094,707 A | | 7/2000 | Sokolov et al. | |
| 6,105,104 A | | 8/2000 | Guttmann et al. | |

(Continued)

OTHER PUBLICATIONS

Mike Yan, "Cold Storage Hardware v0.5 ST-draco-abraxas-0.5" http://www.opencompute.org/wp/wp-contentuploads/2013/01/Open.sub.--Compute.sub.--Project.sub.--Cold.sub.--Storage.sub.--Specifica- tion.sub.--v0.5.pdf, pp. 1-13, Jan. 16, 2013.

(Continued)

*Primary Examiner* — Paul Huber

(57) ABSTRACT

A data storage assembly for cold storage. The data storage assembly includes a circuit board and a plurality of hard disk assemblies (HDA). Each HDA includes a platter and a head assembly to read and write data on the platter. The circuit board includes a processor and a read channel. The processor acts as a hard disk controller for the plurality of HDAs and controls the platters. The processor further manages which HDAs are active at a time and the read channel is shared by the plurality of HDAs.

21 Claims, 13 Drawing Sheets

(56) References Cited

U.S. PATENT DOCUMENTS

Figure 1B:
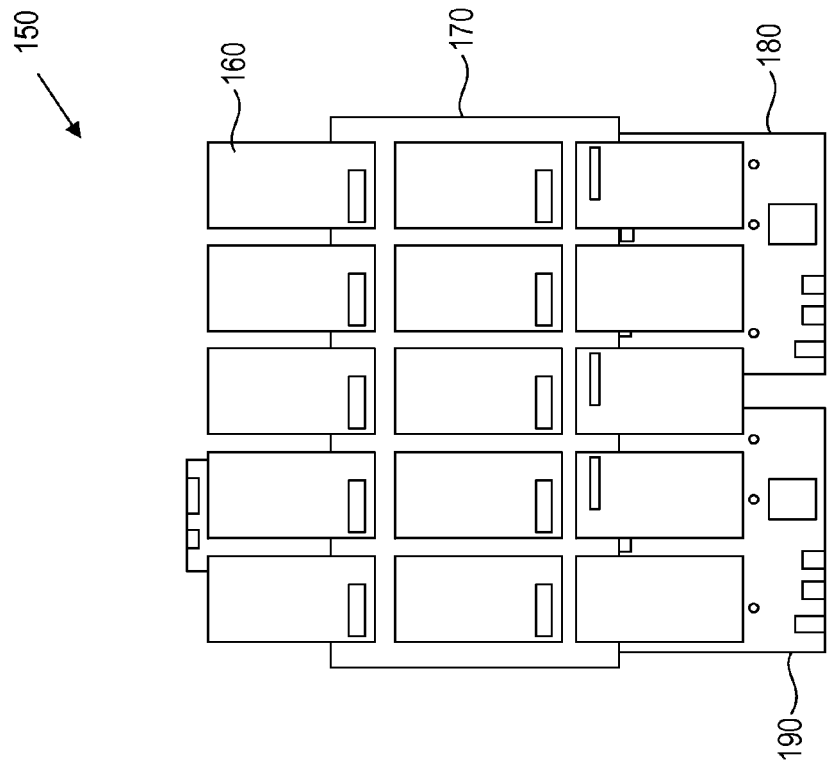

| | | |
|---|---|---|
| 6,111,717 A | 8/2000 | Cloke et al. |
| 6,145,052 A | 11/2000 | Howe et al. |
| 6,175,893 B1 | 1/2001 | D'Souza et al. |
| 6,178,056 B1 | 1/2001 | Cloke et al. |
| 6,191,909 B1 | 2/2001 | Cloke et al. |
| 6,195,218 B1 | 2/2001 | Guttmann et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,809,895 B1 | 10/2004 | Choi |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,910,101 B2 * | 6/2005 | Obara et al. ............ 711/114 |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |

(56) References Cited

U.S. PATENT DOCUMENTS

| | | |
|---|---|---|
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |

(56) References Cited

U.S. PATENT DOCUMENTS

| | | |
|---|---|---|
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Carlson et al. |
| 8,756,382 B1 | 6/2014 | Carlson et al. |
| 8,769,593 B1 | 7/2014 | Schwartz et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton |
| 8,799,977 B1 | 8/2014 | Kapner, III et al. |
| 8,819,375 B1 | 8/2014 | Pruett et al. |
| 8,825,976 B1 | 9/2014 | Jones |
| 8,825,977 B1 | 9/2014 | Syu et al. |
| 8,947,816 B1 * | 2/2015 | Ryan et al. ............ 360/55 |
| 2006/0039108 A1 * | 2/2006 | Chikusa et al. ............ 361/695 |
| 2007/0061638 A1 * | 3/2007 | Nishiuchi et al. ............ 714/718 |
| 2007/0183088 A1 * | 8/2007 | Hatchett et al. ............ 360/97.02 |
| 2009/0113702 A1 | 5/2009 | Hogg |
| 2010/0306551 A1 | 12/2010 | Meyer et al. |
| 2011/0211276 A1 * | 9/2011 | Tsunoda et al. ............ 360/75 |
| 2011/0226729 A1 | 9/2011 | Hogg |
| 2011/0317303 A1 * | 12/2011 | Yoshida ............ 360/31 |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2014/0201424 A1 | 7/2014 | Chen et al. |

OTHER PUBLICATIONS

Notice of Allowance dated Sep. 25, 2014 from U.S. Appl. No. 14/023,386, 6 pages.

Office Action dated Mar. 25, 2014 from U.S. Appl. No. 14/023,386, 15 pages.

* cited by examiner

DATA STORAGE ASSEMBLY FOR ARCHIVE COLD STORAGE

CROSS-REFERENCE TO RELATED APPLICATIONS

This application is a continuation of U.S. application Ser. No. 14/023,386, filed Sep. 10, 2013, which claims the benefit of U.S. Provisional Application No. 61/818,287, filed May 1, 2013, both of which are hereby incorporated by reference in their entirety.

BACKGROUND

Data centers can provide cloud storage systems to remotely store data for networked systems. However, such cloud storage systems can consume large amounts of power at the data center to store and manage data in an array of data storage devices (DSDs).

"Cold storage" or archive storage generally refers to ways of providing more cost effective storage for rarely accessed data. The cost of storage is usually the most important metric, sacrificing time to data. Such cold storage can include powering only the DSD required for an active request for data. For example, the Open Compute specification calls for an Open Vault tray of 15 DSDs. Only one DSD in the tray is powered at a time, to reduce power, heat, and vibration. However, because only one DSD is powered at a time, the other inactive DSDs may include components which are not simultaneously needed or utilized, and may therefore be redundant while consuming excess power.

BRIEF DESCRIPTIONS OF THE DRAWINGS

The features and advantages of the implementations of the present disclosure will become more apparent from the detailed description set forth below when taken in conjunction with the drawings. The drawings and the associated descriptions are provided to illustrate implementations of the disclosure and not to limit the scope of what is claimed.

Figure 1A:
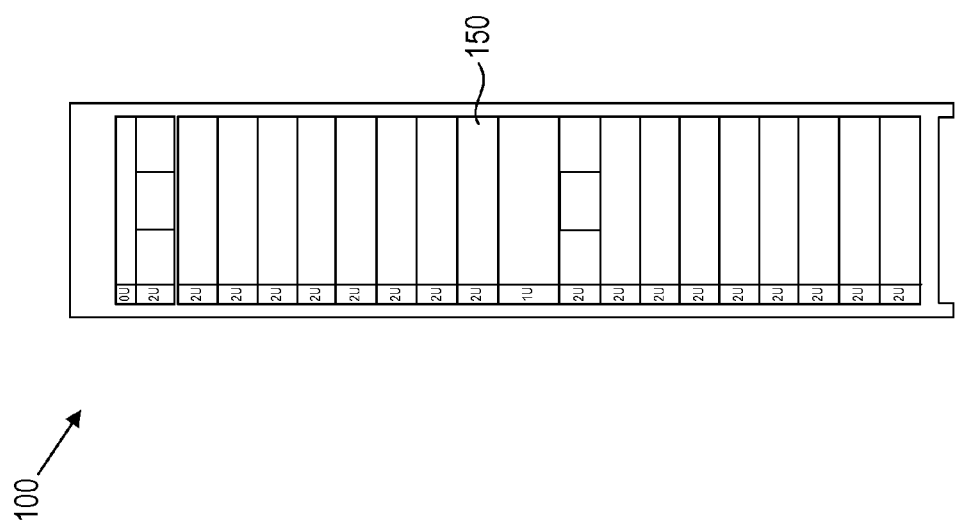
Figure 1C:
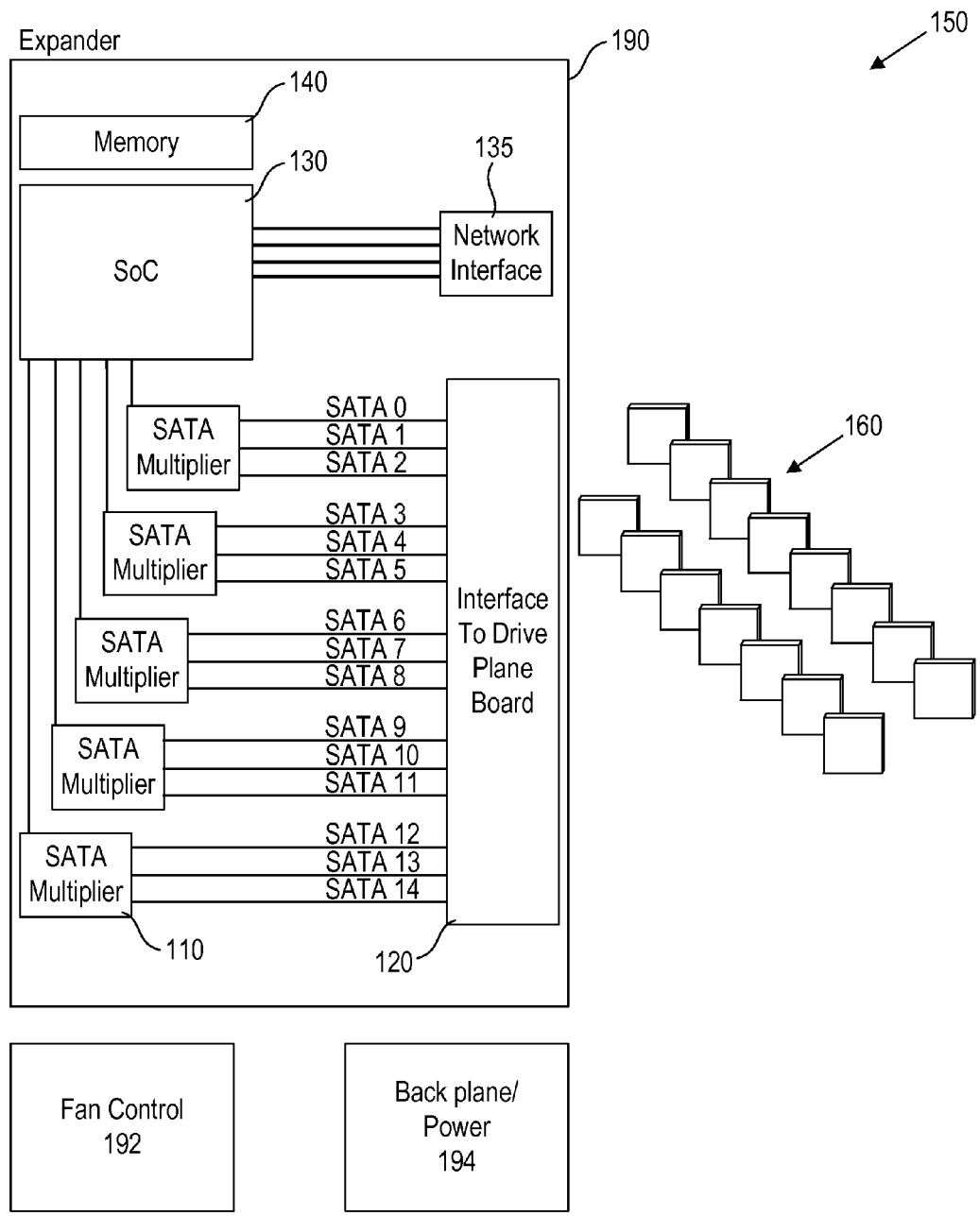
Figure 2A:
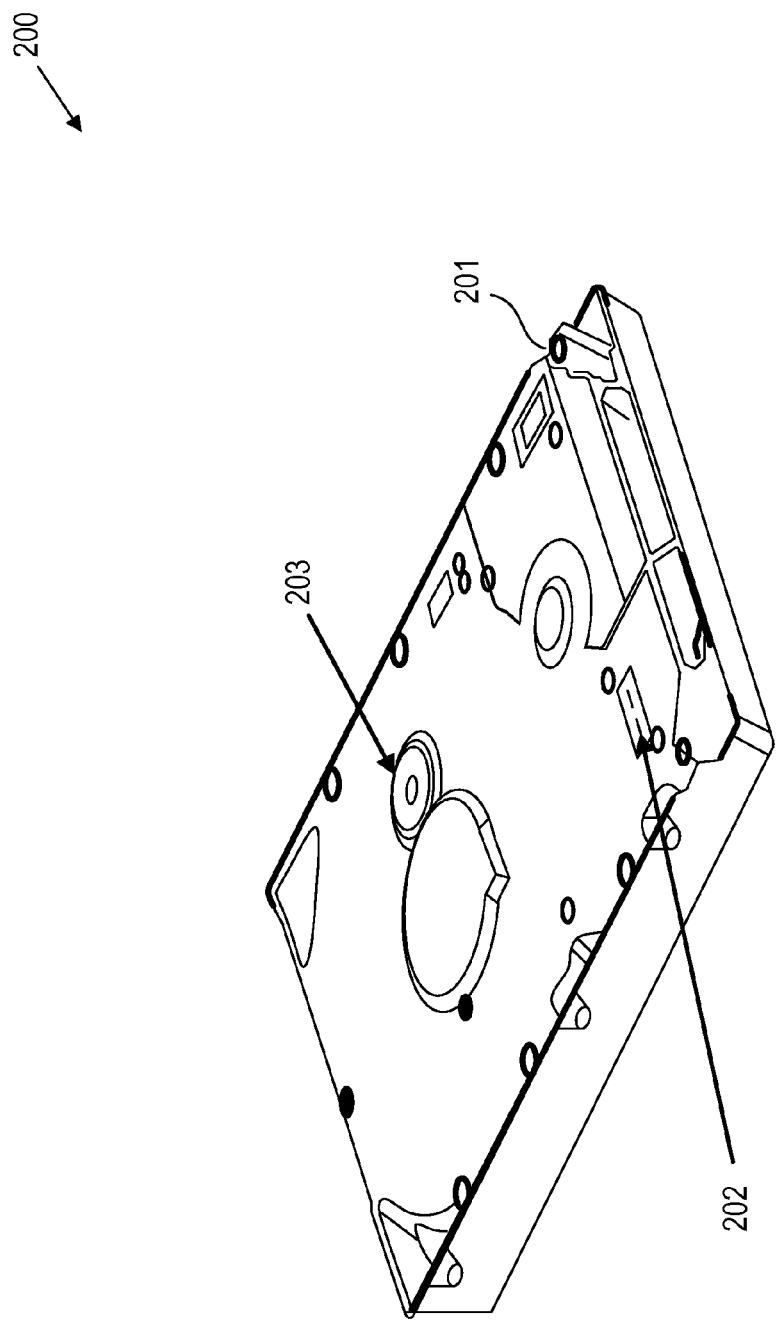
Figure 2B:
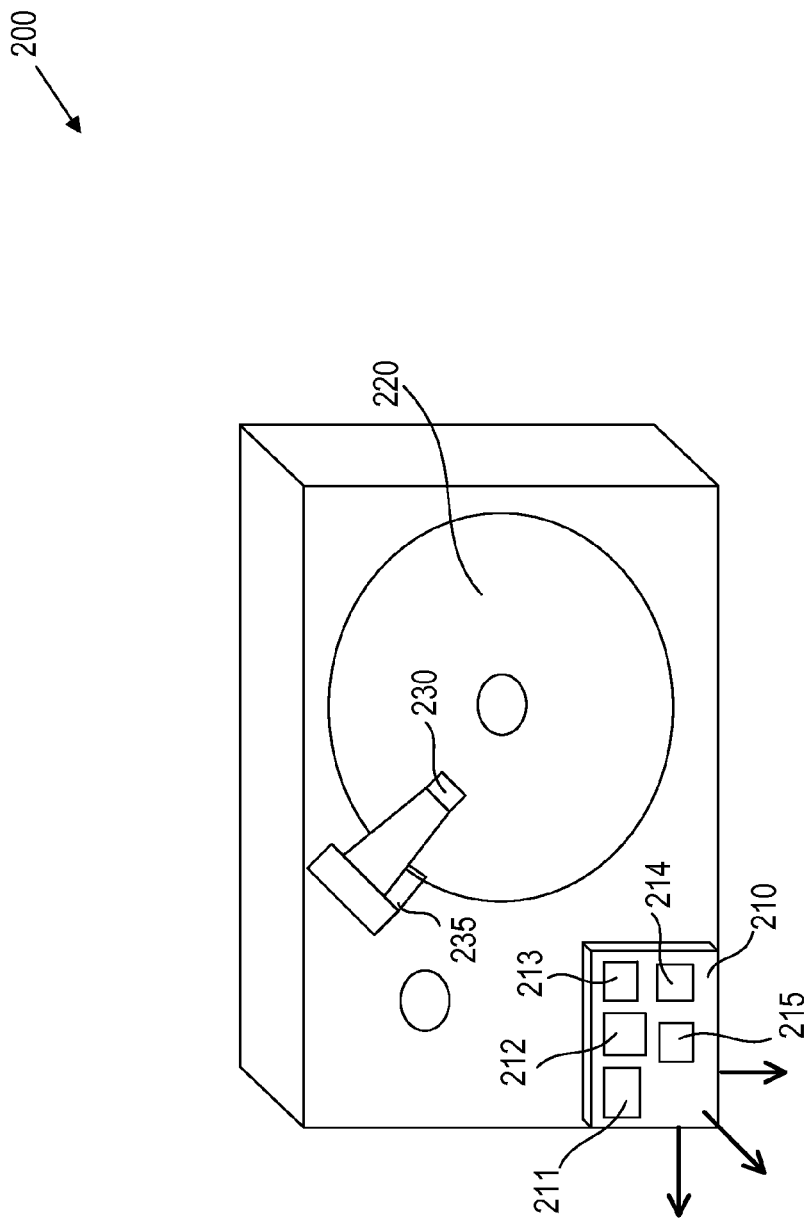
Figure 2C:
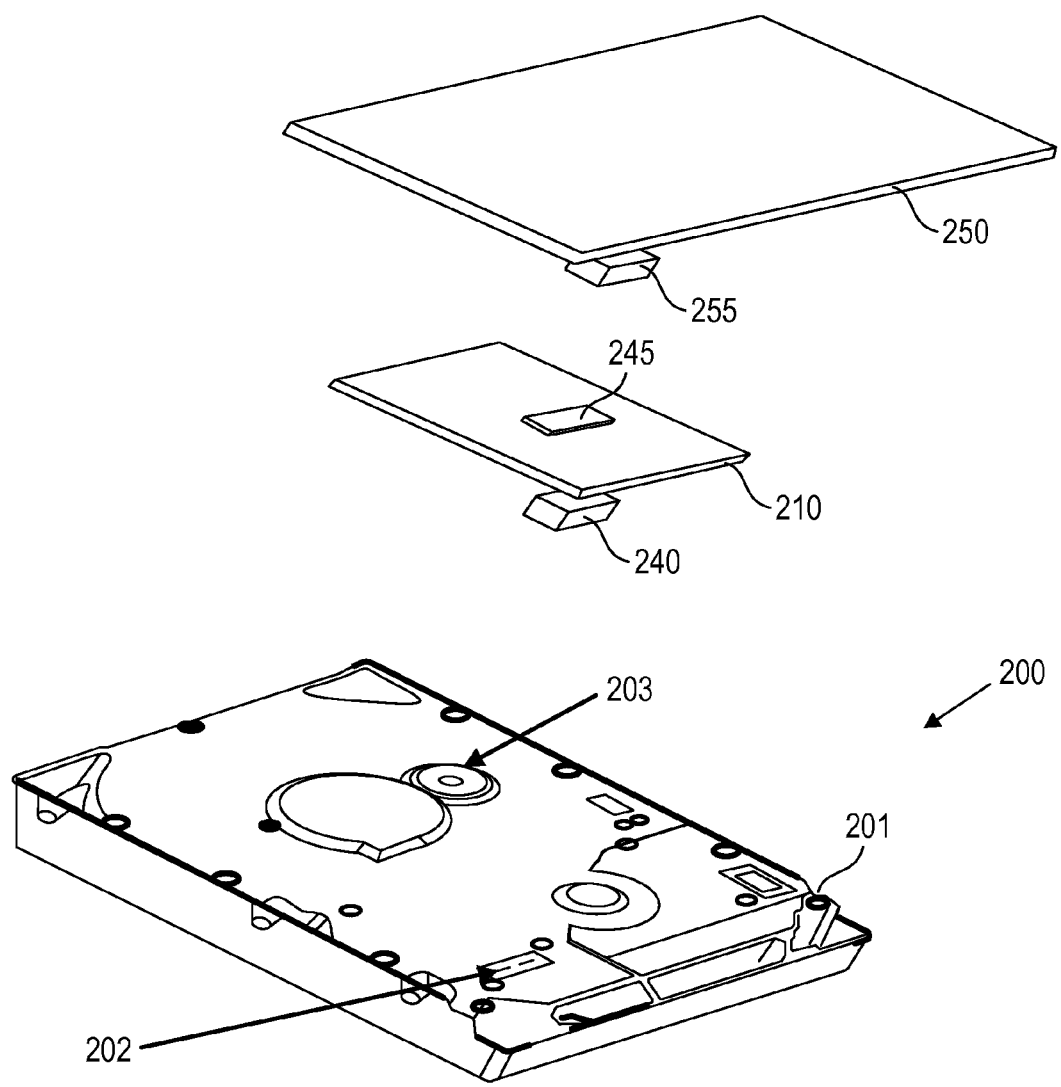
Figure 3:
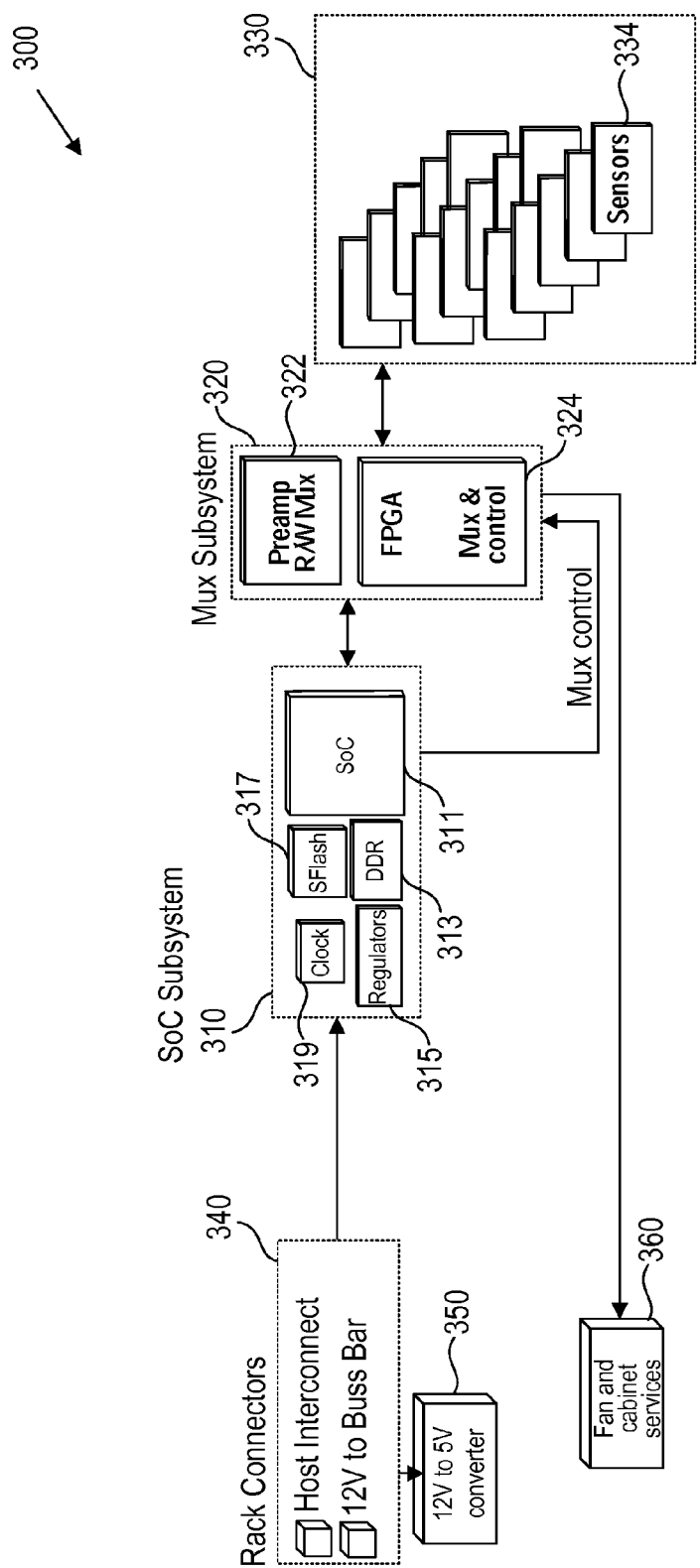
Figure 4A:
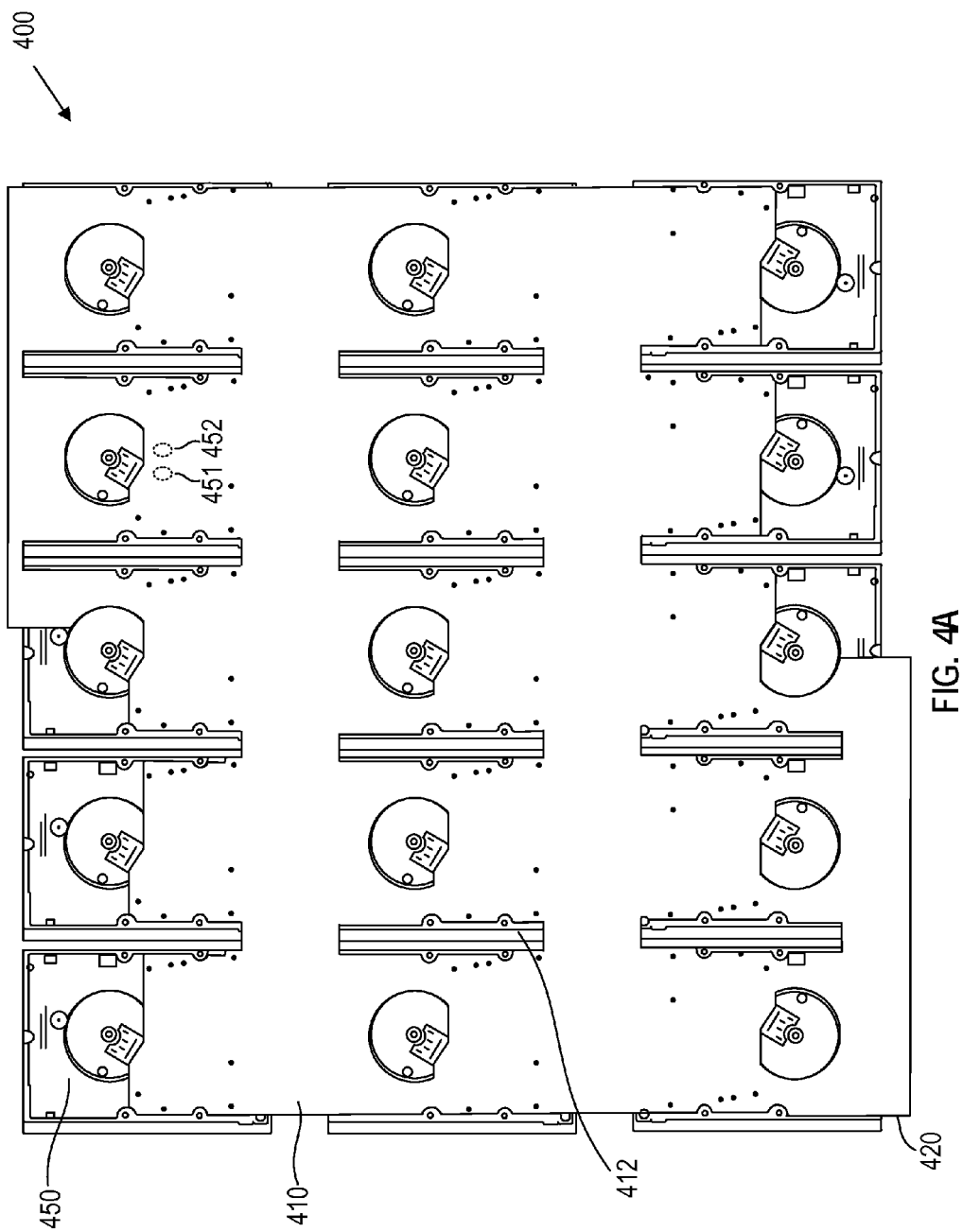
Figure 4B:
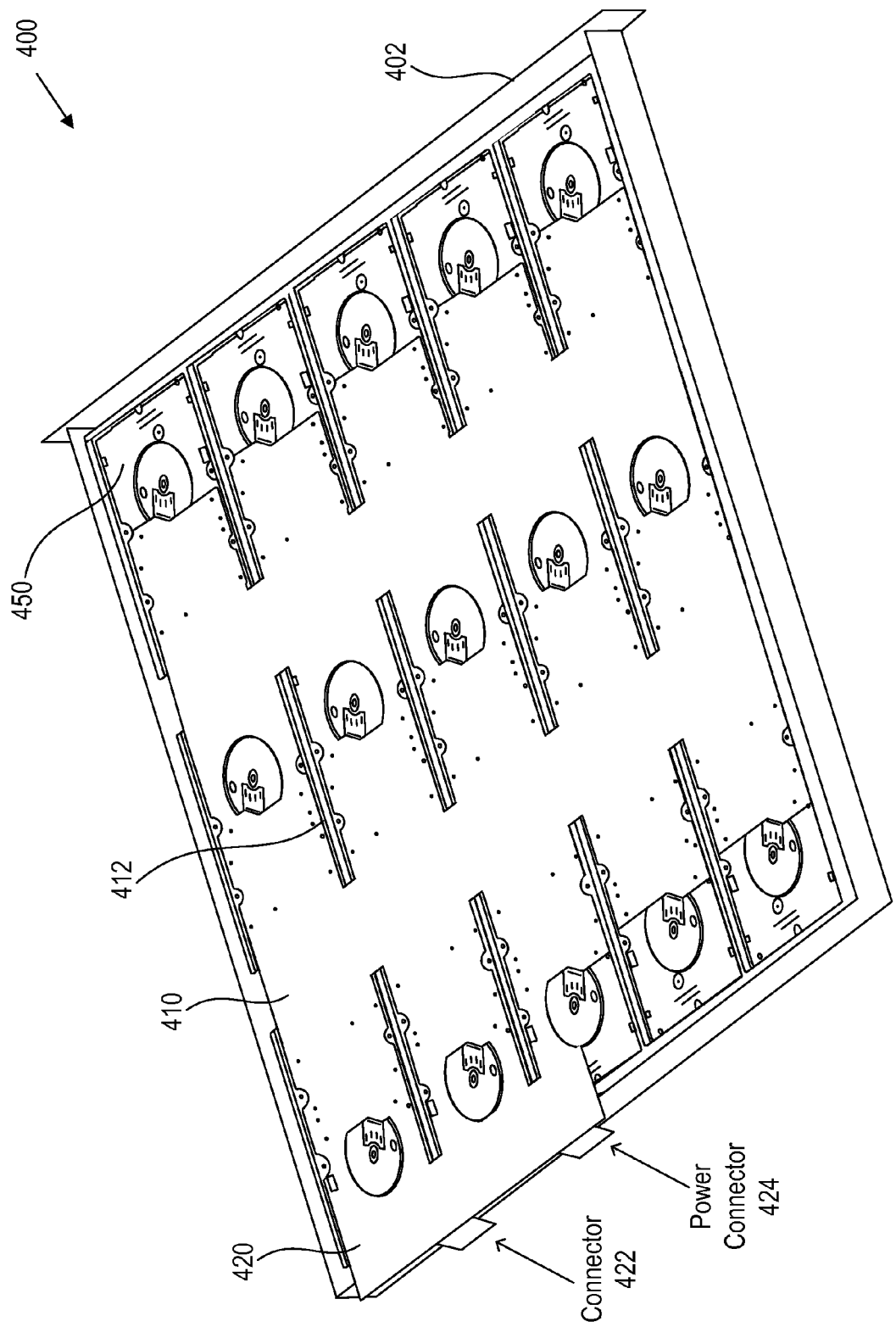
Figure 4C:
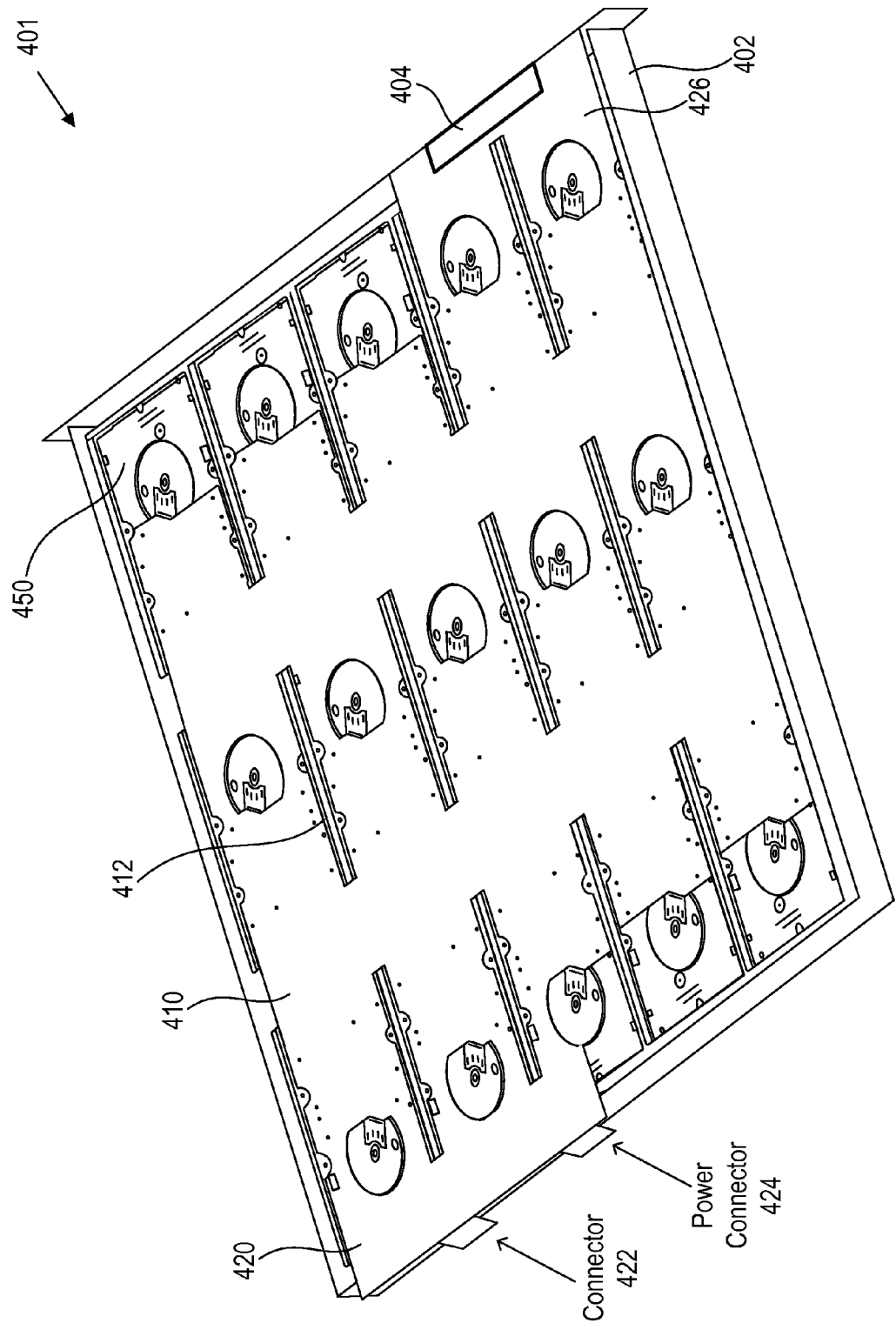
Figure 5A:
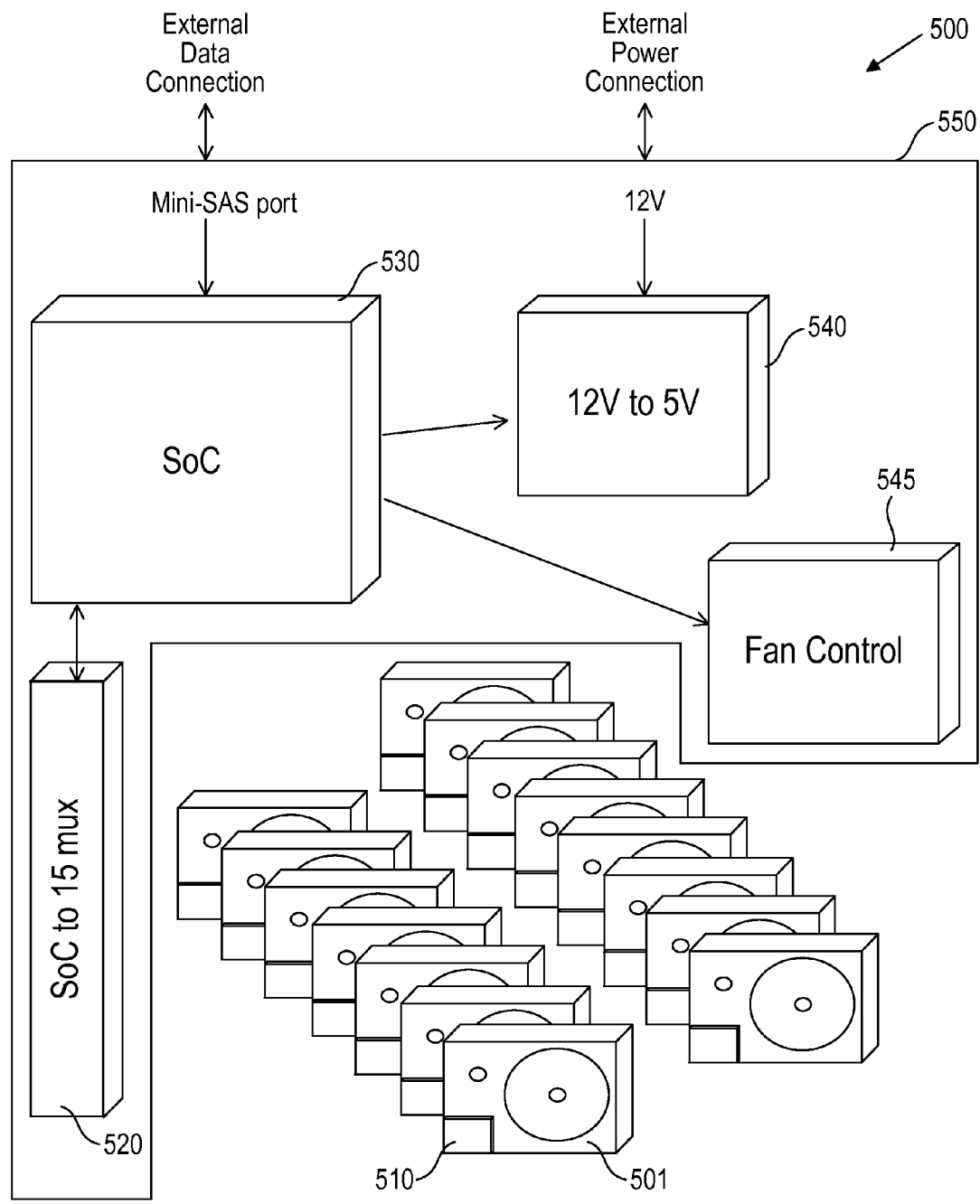
Figure 5B:
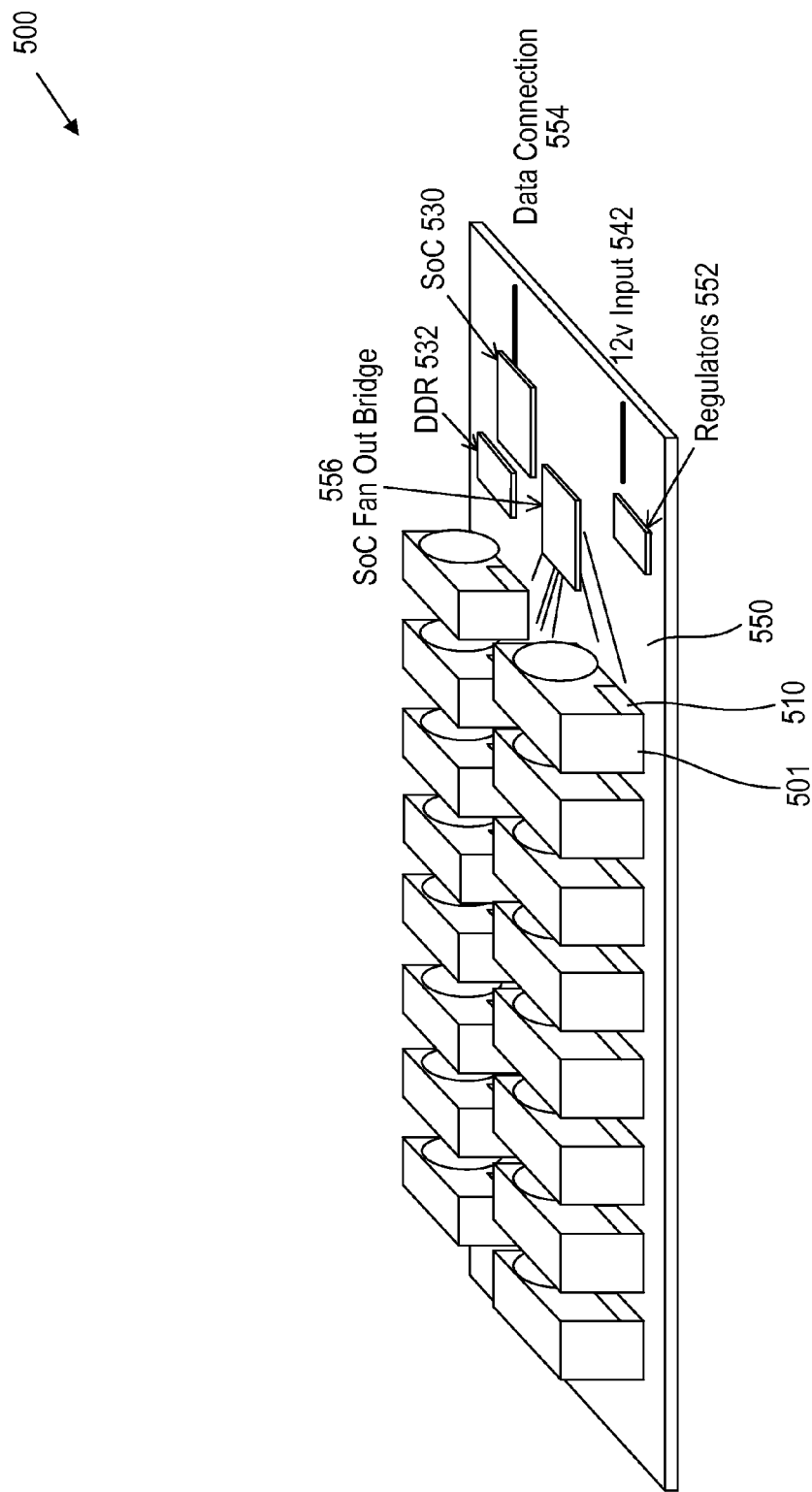
Figure 6:
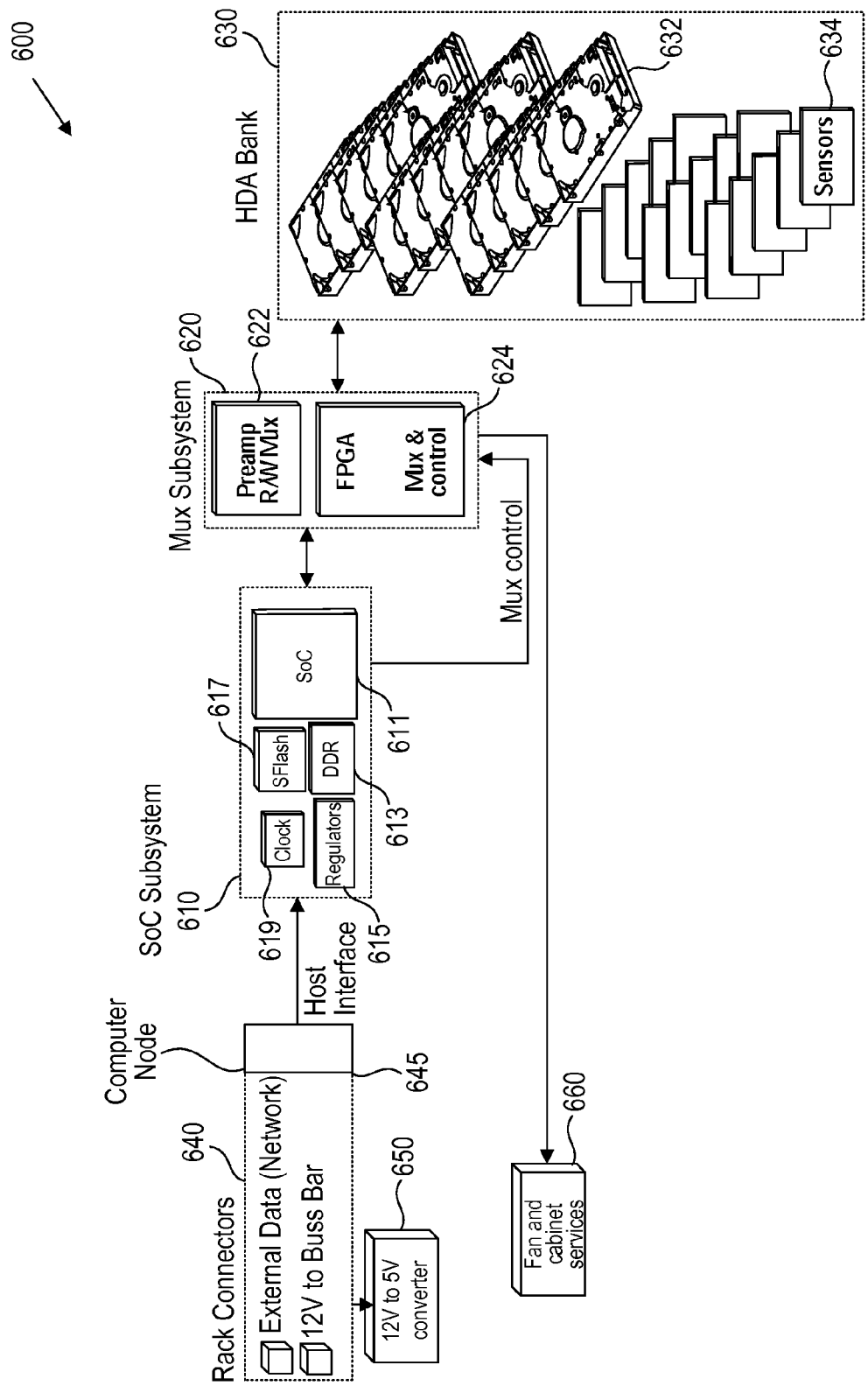
Figure 7:
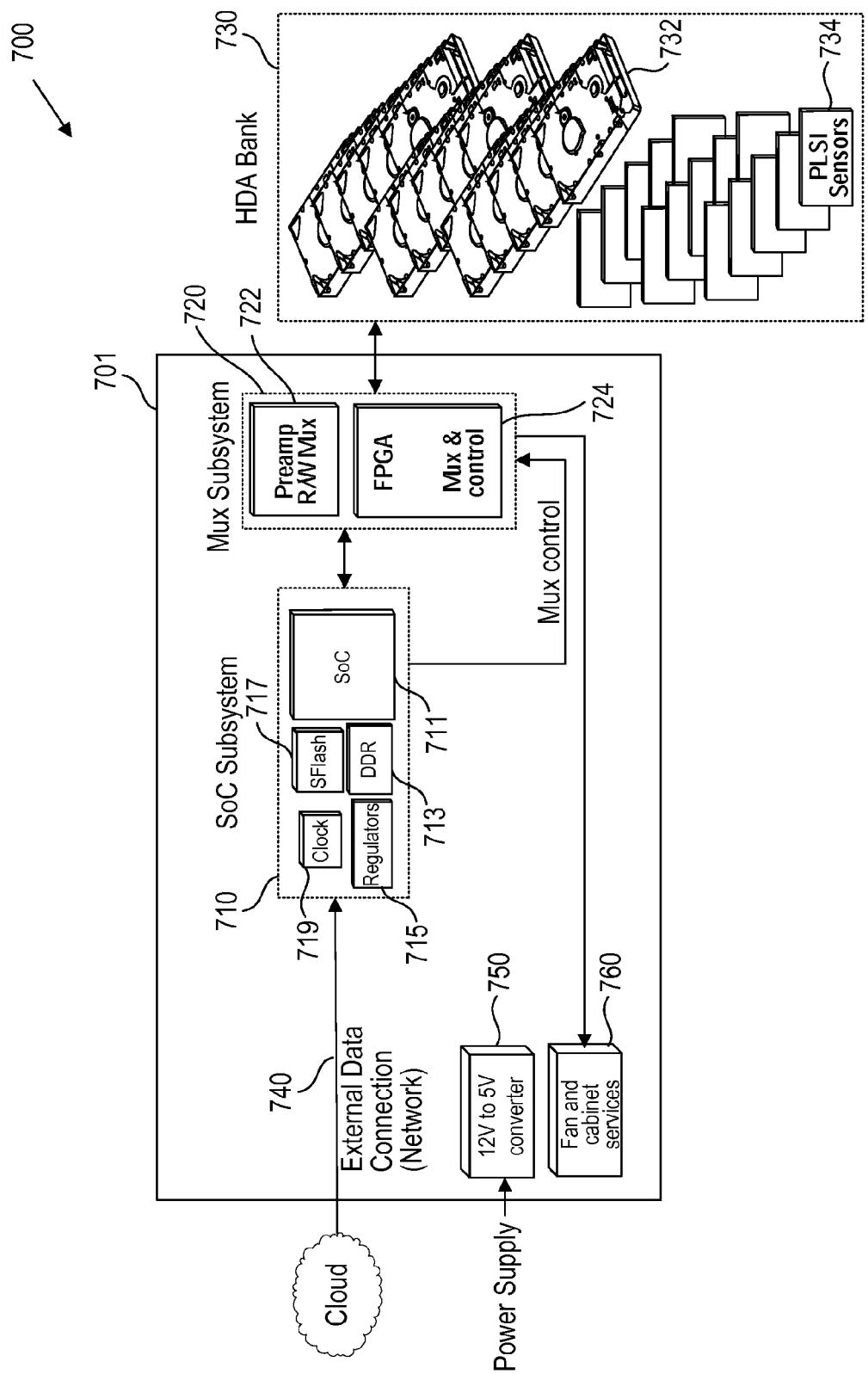

FIG. 1A presents a data storage rack according to an implementation of the present disclosure;

FIG. 1B presents a data storage tray according to an implementation of the present disclosure;

FIG. 1C presents a box diagram of a data storage tray according to an implementation of the present disclosure;

FIG. 2A presents a hard disk assembly (HDA) according to an implementation of the present disclosure;

FIG. 2B presents a conceptual diagram of an HDA according to an implementation of the present disclosure;

FIG. 2C presents an HDA connecting to a main board according to an implementation of the present disclosure;

FIG. 3 presents a single board implementation according to an implementation of the present disclosure;

FIG. 4A presents a top view of a single board implementation according to an implementation of the present disclosure;

FIG. 4B presents a main circuit board according to an implementation of the present disclosure;

FIG. 4C presents a main circuit board according to another implementation of the present disclosure;

FIG. 5A presents a block diagram of a data storage tray according to an implementation of the present disclosure;

FIG. 5B presents a diagram of a data storage tray with a bridge card according to an implementation of the present disclosure;

FIG. 6 presents a diagram of a board configured for distributed computing according to an implementation of the present disclosure; and FIG. 7 presents a diagram of a board configured for distributed computing and a direct input according to an implementation of the present disclosure.

DETAILED DESCRIPTION

In the following detailed description, numerous specific details are set forth to provide a full understanding of the present disclosure. It will be apparent, however, to one of ordinary skill in the art that the various implementations disclosed may be practiced without some of these specific details. In other instances, well-known structures and techniques have not been shown in detail to avoid unnecessarily obscuring the various implementations.

While the description herein refers generally to a NAND flash memory, it is understood that other implementations can include one or more of various types of solid state memory such as Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), spin-transfer torque RAM (STT-RAM), other discrete non-volatile memory (NVM) chips, or any combination thereof.

FIG. 1A presents a server rack 100, which may be used for cold storage. The server rack 100 includes a plurality of trays 150 for storing DSDs. FIG. 1B presents a tray 150. The tray 150 includes a plurality of DSDs 160, a drive-plane board 170, a Serially Attached SCSI (SAS) expander board 180, and an expander board 190. The tray 150 may follow the Open Compute specification for an Open Vault tray of 15 DSDs. Although the present disclosure discusses the Open Compute specifications, implementations of the present disclosure are not limited to the Open Compute specification and may be adapted to work with other specifications or applications.

The DSDs 160 may be a conventional drive, such as a hard disk drive (HDD), solid state drive (SSD), solid state hybrid drive (SSHD), or other DSD known in the art. The DSDs 160 are each connected to the drive-plane board 170, which may provide more mechanically reliable connections than cables. The drive-plane board 170 allows for connections to each individual DSD 160. For example, the SAS expander board 180 may be a plug-in card that connects to each DSD 160 through the drive-plane board 170. Because SAS is typically a point-to-point connection (i.e. a direct connection between a host system and a device), the SAS expander board 180 manages multiple direct or point-to-point connections to each DSD 160. Power flows through the drive-plane board 170. The expander board 190 may manage a fan (not shown) and power connections.

FIG. 1C presents a conceptual diagram of the tray 150. The expander board 190 includes a memory 140, a System-on-Chip (SoC) 130, a network interface 135, a plurality of SATA multipliers 110, and a drive plane board interface 120. The SoC 130 may include a processor as well as other components integrated into a single chip. The expander board 190 works in conjunction with a fan card 192 and a backplane card 194. Interfacing with 16 DSDs 160 is performed with at least 4 SATA multipliers 110, which can consume power, create heat, and increase manufacturing costs.

FIG. 2A illustrates a view of a hard disk assembly (HDA) 200 according to an implementation of the present disclosure. The HDA 200 includes a main device 201, a feed through connector 202 and a helium charge port 203. The HDA 200 may be a conventional drive, such as a hard disk drive (HDD), solid state drive (SSD), solid state hybrid drive (SSHD), or other DSD known in the art. In addition, the HDA 200 may be a modified DSD, as will be discussed below.

FIG. 2B presents a conceptual block diagram of the HDA 200. The HDA 200 includes a printed circuit board assembly (PCBA) or bridge board (or bridge card) 210, a platter 220, a head assembly 230, and a preamp 235 to reduce a Signal-to-Noise Ratio (SNR) for data read from platter 220. The HDA 200 may include an increased or decreased number of platters 220 than conventionally used. The bridge board 210 includes a preamp 211, a motor controller 212, a bridge 213, a first circuitry 214, and a second circuitry 215. The preamp 211 may further reduce a SNR for data read from platter 220. The first circuitry 214 and/or the second circuitry 215 may be a sensor, a power large-scale integrated circuit (PLSI), an emergency power off retract (EPOR), or other component. In alternative implementations, the bridge board 210 may include more or less of the above components, in that the components are optional.

The HDA 200 is a simplified disk drive without certain circuitry. Circuitry for functions such as a primary read channel, controller, host interface, and memory are moved to a shared circuit board, such as a shared bridge board 210 or a shared motherboard/main board (MB) 250 in FIG. 2C, to reduce redundant components. Because only one drive is powered on at a time, one instance of circuitry functions such as primary read channel, controller, host interface, and memory can be shared by the drives to reduce components, cost, heat, and power consumption.

FIG. 2C depicts one implementation of mounting the HDA 200 to the MB 250. The bridge board 210 further includes an HDA connector 240 and MB connector space 245. The MB 250 includes a MB connector 255.

The HDA 200 connects to the HDA connector 240 through, for example, the feed through connector 202. The HDA connector 240 and the feed through connector 202 may be interchanged or modified to match DSD design and assembly processes. The MB connector 255 connects to the MB connector space 245. The MB connector 255 and the MB connector space 245 may be similar to the HDA connector 240 and the feed through connector 202. Alternatively, the MB connector 255 and the MB connector space 245 may be an alternate or unique configuration to facilitate the preferred orientation and removability of the HDA 200. The bridge board 210 may be on a parallel plane as the MB 250 and the HDA 200. Alternatively, the bridge board 210 may be placed perpendicular to the MB 250, as an edge card.

FIG. 3 presents a conceptual diagram of a single board implementation, an MB 300. Rack connectors 340 provide host and power connections to the MB 300, specifically connecting a host to the SoC subsystem 310 and a 12V power connection to a power converter 350. Although FIG. 3 depicts a 12V power supply, in other implementations other appropriate power connections and voltages may be utilized.

The SoC subsystem 310 includes a clock 319, a flash memory 317, an SoC 311, a random-access memory (RAM) 313, and a regulator 315. The SoC 311 may include a processor as well as other circuitry integrated onto a single chip. The SoC subsystem 310 and/or the SoC 311 may serve as a controller and may perform other functions, such as error recovery for reading and writing data. The SoC subsystem 310 further interfaces with a multiplexer (mux) subsystem 320.

The mux subsystem 320 includes a preamp mux 322 and a mux controller 324. The mux subsystem 320 connects to a bank 330, which includes a plurality of sensors 334. The sensors 334 may be PLSI sensors mounted in the same location as a production HDA circuit board, to ensure that accurate shock and vibration information is captured and communicated to the SoC subsystem 310. The mux subsystem 320 also controls a fan and cabinet services 360, which can include lights, fan control, and temperature reporting.

The MB 300 includes the plurality of sensors 334 to ensure better reliability by having a sensor 334 for each attached HDA (not shown in FIG. 3). In other implementations, the bank 330 may include more or less sensors 334. The mux subsystem 320 allows the plurality of sensors 334 to communicate with the SoC subsystem 310.

Because the HDAs are configured without their own individual hard disk controllers (HDC), the SoC subsystem 310 acts as the HDC, connected through the mux subsystem 320. The SoC subsystem 310 replaces redundant HDCs from the HDAs. The SoC subsystem 310 further controls which HDAs are activated or powered up. For example, the SoC subsystem 310 may power up only one HDA. In alternative implementations, the SoC subsystem 310 may power up more than one HDA, for example to actively read/write data from one HDA while another HDA finishes a background task before powering down. The use of the SoC subsystem 310 reduces the amount of components on the MB 300, which further reduces manufacturing costs as well as reduces heat and power consumption.

FIG. 4A shows a data storage tray 400. FIG. 4A depicts a top view of an MB 410, which is placed over a plurality of HDAs 450. Slots 412 in the MB 410 allow clearance for rails of the HDAs 450. An extended tab 420 allows for power and data connection ports. The extended tab 420 is about half the width of the MB 410, which allows panelization, which during manufacturing allows multiple copies of the MB 410 to be cut out of a single board. For example, if the main board 410 is rotated 180 degrees, it can be placed along another MB 410, with the extended tabs 420 fitting together before the individual MBs 410 being cut. In other implementations the width of the extended tab 420 may be more or less than the width of the MB 410. A motor driver 451 and a sensor 452 are located under the main board 410, at a location corresponding to the location for a motor driver and a sensor on a standalone DSD. An SoC subsystem, such as the SoC subsystem 310 in FIG. 3, and a mux subsystem, such as the mux subsystem 320, may be centrally located on the main board 410 (not visible in FIG. 4A), but in other implementations may be located elsewhere as needed. For example, the SoC and mux subsystems may be located closer to an edge for easier mounting of HDAs 450 or for shorter connections.

FIG. 4B shows another view of the data storage tray 400. The main board 410 and the plurality of HDAs 450 are mounted onto a tray 402. In this view, a connector 422 and a power connector 424 are visible. The connector 422 may be a mini SAS connector, although in other implementations, the connector 422 may be a connector for another suitable protocol. The power connector 424 may be a 12V power connection, although in other implementations, other suitable power connectors may be used.

Mounting the HDAs 450 directly to the MB 410, as in FIG. 4B, allows the use of existing HDA to board connectors and signal impedance matching techniques, which provides a simple, low cost implementation.

FIG. 4C depicts an alternate data storage tray 401. The data storage tray 401 differs from the data storage tray 400 in FIG. 4B in that the MB 410 includes a second extended tab 426.

The second extended tab 426 is less than half the width of the main board 410, and is also less than the width of the extended tab 420, although in other implementations the width of the second extended tab 426 may vary as needed. The second extended tab 426 includes an interface 404. The interface 404 may be used for lights, such as status indicators or other light emitting diodes (LED), additional display, or another connection, such as a data connection.

FIG. 5A shows a conceptual diagram of a data storage tray 500. The data storage tray 500 includes a MB 550 including a SoC subsystem 530, a power converter 540, a fan controller 545, and a mux subsystem 520. The SoC subsystem 530 may include a processor as well as other circuitry incorporated into a single chip. The data storage tray 500 further includes a plurality of HDAs 501, each of which includes a bridge board 510. Unlike in FIGS. 4A-C, the HDAs 501 are not directly mounted or attached to the MB 550, but use bridge boards 510. The use of the bridge boards 510 allows easier hot plug and replacement. The HDA 501 can be removed while leaving the bridge board 510 connected to the main board 550, because the connectors, such as the HDA connector 240, facilitate removal of the HDA 501. Alternatively, the bridge board 510 may be removed along with the HDA 501 such that another HDA 501, which may or may not have a respective bridge board 510, may be connected to the MB 550. The use of the bridge boards 510 allows further flexibility in the types of connections and connectors compatible with the MB 550.

FIG. 5B depicts a simplified diagram of the data storage tray 500. The MB 550 includes regulators 552, a power input 542, a RAM 532, the SoC subsystem 530, a data connection 554, and a fan out bridge 556. The data connection 554 may be an SAS interface for connecting to a compute node, but in alternative implementations other suitable protocols may be used. Motor controllers, such as the motor controller 212, on the bridge board 510 allows the HDAs 501 to be hot swapped with emergency power off retract ability, which safely prevents heads, such as the head assembly 230, from contacting and damaging the disks, such as the platter 220.

FIGS. 6 and 7 depict implementations configured for distributed computing. FIG. 6 shows a diagram of a data storage tray 600, which includes rack connectors 640, a compute node 645, a power converter 650, a fan and cabinet services 660, an SoC subsystem 610, a mux subsystem 620, and an HDA bank 630. The SoC subsystem 610 includes a clock 619, regulators 615, a RAM 613, a flash memory 617, and an SoC 611. The SoC 611 may include a processor as well as other circuitry integrated into a single chip. The mux subsystem 620 includes a preamp mux 622 and a mux controller 624. The HDA bank 630 includes a plurality of HDAs 632, and a respective plurality of sensors 634. The rack connectors 640 include a power connection and an external data connection (or network connection), which connects to the compute node 645. The compute node 645 may be a processor for use in a distributed computing system, and may be aware of other compute nodes to share data object manipulation and perform distributed computing tasks, such as running a SQL database. Although Ethernet is a common network interface, other suitable protocols may be used for the external data/network connection. Likewise, the host interface may be SAS, although PCIe or other protocols may be used.

FIG. 7 presents a diagram of another implementation configured for distributed computing. A data storage tray 700 includes an HDA bank 730, and an MB 701 which further includes a power converter 750, a fan and cabinet services 760, an SoC subsystem 710, and a mux subsystem 720. The SoC subsystem 710 includes a clock 719, a flash memory 717, an SoC 711, a RAM 713, and regulators 715. The SoC 711 may include a processor as well as other circuitry integrated into a single chip. The mux subsystem 720 includes a preamp mux 722 and a mux controller 724. The HDA bank 730 includes a plurality of HDAs 732, with a corresponding plurality of sensors 734.

Unlike the data storage tray 600, the data storage tray 700 lacks a compute node and rack connectors. An external data connection or network connection 740, such as Ethernet or other suitable protocol, allows direct connection to the SoC subsystem 710 for a distributed computing system to share data object manipulation and distributed computing tasks with at least one external processor.

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example implementations is provided to enable any person of ordinary skill in the art to make or use the implementations in the present disclosure. Various modifications to these examples will be readily apparent to those of ordinary skill in the art, and the principles disclosed herein may be applied to other examples without departing from the spirit or scope of the present disclosure. The described implementations are to be considered in all respects only as illustrative and not restrictive and the scope of the disclosure is, therefore, indicated by the following claims rather than by the foregoing description. All changes which come within the meaning and range of equivalency of the claims are to be embraced within their scope.

The invention claimed is:

1. A data storage assembly comprising:
   a circuit board comprising:
      a processor; and
      a read channel; and
   a plurality of hard disk assemblies (HDAs), each HDA comprising:
      a platter configured to store data; and
      a head assembly configured to read data from and write data to the platter;
   wherein the processor is configured to be a hard disk controller (HDC) for the plurality of HDAs and manage which of the plurality of HDAs are active at a time, and the plurality of HDAs are configured to share a read channel among the plurality of HDAs.

2. The data storage assembly of claim 1, wherein the processor is further configured to determine which one of the plurality of HDAs to utilize for a data command.

3. The data storage assembly of claim 1, wherein the processor is further configured to perform error recovery for reading and writing to the plurality of HDAs.

4. The data storage assembly of claim 1, further comprising a motor controller configured to spin the platters of the plurality of HDAs and move the head assemblies of the plurality of HDAs across the respective platters of the plurality of HDAs.

5. The data storage assembly of claim 1, further comprising a multiplexer configured to communicate with each of the plurality of HDAs.

6. The data storage assembly of claim 1, further comprising a plurality of sensors configured to detect environmental information of the plurality of HDAs.

7. The data storage assembly of claim 1, wherein the processor is further configured to manage power to the plurality of HDAs.

8. The data storage assembly of claim 1, further comprising a network connection.

9. A hard disk assembly (HDA) comprising:
   a platter configured to store data;
   a head assembly configured to read data from and write data to the platter;
   a motor controller configured to move the head assembly across the platter; and
   a circuit board configured to communicate between the HDA and a read channel external to the HDA and shared among a plurality of HDAs.

10. The HDA of claim 9, wherein the circuit board is further configured to communicate between the HDA and a memory external to the HDA and shared among a plurality of HDAs.

11. The HDA of claim 9, wherein the circuit board further includes a preamp configured to reduce a Signal-to-Noise Ratio (SNR) for data read from the platter.

12. The HDA of claim 9, wherein the circuit board further includes a power large-scale integrated circuit (PLSI) configured to allow hotplugging the HDA.

13. The HDA of claim 9, wherein the circuit board further includes an emergency power off retract (EPOR) configured to safely power off the HDA.

14. The HDA of claim 9, wherein the HDA is further configured to communicate with a network via a network connection external to the HDA that is shared among the plurality of HDAs.

15. A non-transitory computer readable medium storing computer executable instructions for controlling a plurality of hard disk assemblies (HDAs), wherein when the computer executable instructions are executed by circuitry, the computer executable instructions cause the circuitry to:
   manage which of the plurality of HDAs are active at a time; and
   act as a hard disk controller (HDC) for the plurality of HDAs so that the plurality of HDAs share a read channel among the plurality of HDAs.

16. The non-transitory computer readable medium of claim 15, wherein the computer executable instructions further cause the circuitry to determine which one of the plurality of HDAs to utilize for a data command.

17. The non-transitory computer readable medium of claim 15, wherein the computer executable instructions further cause the circuitry to perform error recovery for reading data from and writing data to the plurality of HDAs.

18. The non-transitory computer readable medium of claim 15, wherein the computer executable instructions further cause the circuitry to act as an HDC for the plurality of HDAs so that the plurality of HDAs share a memory among the plurality of HDAs.

19. The non-transitory computer readable medium of claim 15, wherein the computer executable instructions further cause the circuitry to interface with a multiplexer to receive environmental information from a plurality of sensors for the plurality of HDAs, with each of the plurality of sensors detecting environmental information for one of the plurality of HDAs.

20. The non-transitory computer readable medium of claim 15, wherein the computer executable instructions further cause the circuitry to manage power to the plurality of HDAs.

21. The non-transitory computer readable medium of claim 15, wherein the computer executable instructions further cause the circuitry to interface with a network connection.

* * * * *